United States Patent [19]

Uchigaki et al.

[11] 3,931,077

[45] Jan. 6, 1976

[54] REACTIVE HOT MELT ADHESIVE COMPOSITION AND METHOD FOR USE THEREOF

[75] Inventors: Taku Uchigaki; Kenichi Omori; Masataka Okamura, all of Yokkaichi, Japan

[73] Assignee: Mitsui Petrochemical Industries, Ltd., Japan

[22] Filed: Jan. 4, 1974

[21] Appl. No.: 432,844

[30] Foreign Application Priority Data

Jan. 11, 1973 Japan................................ 48-5528

[52] U.S. Cl.................... 260/26; 260/24; 260/27 R; 260/27 EV; 260/858
[51] Int. Cl.².......................................... C08L 93/00

[58] Field of Search......... 260/24, 27 EV, 26, 27 R, 260/858

[56] References Cited
UNITED STATES PATENTS

| | | | |
|---|---|---|---|
| 3,242,230 | 3/1966 | Habib | 260/24 |
| 3,703,492 | 11/1972 | Masuda | 260/27 EV |

*Primary Examiner*—Lewis T. Jacobs
*Attorney, Agent, or Firm*—Robert E. Burns; Emmanuel J. Lobato; Bruce L. Adams

[57] ABSTRACT

A reactive hot-melt adhesive composition useful for bonding is described comprising a reactive urethane prepolymer, a thermoplastic polymer, and a tackifier. A method for using this composition which melts at lower than hot-melt adhesive temperatures and has good pot-life is also described.

5 Claims, No Drawings

REACTIVE HOT MELT ADHESIVE COMPOSITION AND METHOD FOR USE THEREOF

FIELD OF THE INVENTION

This invention relates to an adhesive composition having the combined characteristics of both hot melt-type and reactive-type adhesives.

BACKGROUND OF THE INVENTION

The prior art has recognized two types of adhesive compositions; hot melt-type adhesive compositions and reactive-type adhesive compositions.

The hot melt adhesive compositions provide instant adhesive strength upon cooling after bonding so that the workability of the bonded product is excellent. However, they have disadvantages of low adhesive strength at elevated temperatures because of their rheological characteristics.

In order to obtain high heat adhesive strength at elevated temperatures, it is conventional to use reactive or curable adhesive compositions. However, the initial adhesive strength of such compositions is weak because the time for reactive curing is too short, consequently high instant adhesive strength cannot develop as with hot melt-type adhesives. Accordingly, when the reactive adhesives are used for the preparation of multi-layered sheets such as corrugated boards or plied boards, the handling characteristics, during manufacture, are poor.

The hot melt-type adhesive compositions generally have 100% of solid component. They are applied in a melted condition (in general at temperatures in the range 160° – 200°C.) They instantly bond the two substrates upon cooling at a temperature lower than the melting point of the composition.

The thermophysical characteristics of each component of the composition controls the viscosity of the melted adhesive composition as well as the final physical strength of the adhesive resin and the characteristics of temperature dependency. Accordingly, it has been required to select the adhesive characteristics from the viewpoint of the melting temperature, the final physical adhesive characteristics and the temperature dependency required in each application.

The viscosity of melted adhesive compositions are closely limited by the requirement of coating workability though it depends upon the type of coater that is used. In order to give a suitable coatable viscosity of the melted adhesives, each of the components should have a relatively low melting point and softening point. To meet these requirements, it has been required to increase concentration of additives of low molecular weight material which have high temperature dependency and low adhesive property, such as wax.

These requirements for the conventional hot melt-type adhesive compositions result in inferior physical strength and a temperature dependency characteristic during the application procedures. It has been proposed to decrease the viscosity of the melted adhesive composition by rising the temperature during coating. However, the thermal stability of the components of the melt adhesive compositions is limited, begins to rapidly degrade at about 200°C. It has thus been difficult to modify the melted viscosity, the physical strength or the temperature dependency of such prior art melt adhesives. Moreover, in order to properly heat to such high temperatures at the time of coating, it has been difficult to use chemically-active ingredients as they tend to become thermally unstable, so that only low adhesive strength is possible because of weak adhesives thus available.

Non-solvent type reactive adhesive compositions have high reactivity at elevated temperatures so that such compositions have a pot-life that is too short. For this reason reactive adhesive compositions are coated at about room temperature. For this reason, it has been necessary in order for such compositions to have coatable low viscosity at room temperature, that the substrates be bonded with a monomer or a prepolymer having a low molecular weight. With such monomers or prepolymers the cohesive properties have been too low to impart a suitable instant adhesive force. Solvent-type reactive adhesive compositions have been used wherein a high molecular weight compound having an effective reactivity or a mixture of reactive low molecular weight compounds and another reactive component to form the reactive composition is dissolved in a solvent. The solution is mixed with a hardener solution and this mixture is coated and slightly dried (by hot-air, etc.) and the coated substrates are bonded in a viscous condition. Even here the instant adhesive strength at the time of bonding is too low. Various other types of adhesives such as emulsion-type and solvent-type adhesives, have been tried but suitable adhesive strength can be imparted only after removing water or the solvent. The final adhesive strength here too is relatively low. The characteristics of the prior art conventional adhesive compositions are shown in Table 1.

TABLE 1

| Type of Adhesive | Pot-life for coating | Instant adhesive strength (room temp. to 60°C.) | Applicable environment temperature |
|---|---|---|---|
| Commercially available hot melt-type adhesive | O | O | x |
| Non-solvent-type reactive adhesive | O | x | O |
| Solvent-type reactive adhesive | O | x | O |
| Solvent-type non-reactive adhesive | O | x | x |

( O .... good, X .... bad)

It can been seen from Table 1 that the prior art has provided no adhesive composition having the three important functions of (a) pot-life for coating, (b) an instant adhesive strength at a room temperature to 60°C. and (c) an applicable environment temperature. It is clear, from the above description of adhesive compositions, that it has been difficult to impart these three important functions.

The conventional adhesive compositions previously available have not been suitable for the preparation of polymeric corrugated boards, film-laminated sheets, plied boards or other multi-layered sheets, which requires during manufacture, a high instant adhesive strength and also high final adhesive strength between the layers of such sheets.

SUMMARY OF THE INVENTION

It is an object of the invention to provide a combined reactive hot melt-type adhesive composition having a long pot-life and high instant adhesive strength and good application environment temperature characteristics. It is another object of the invention to provide a reactive hot melt-type adhesive composition having the high instant adhesive strength and other characteristics which are similar to those of the conventional hot melt-type adhesive compositions and having high final adhesive strength after bonding and the application environment temperatures which are similar to those of the conventional reactive adhesive composition. It is the other object of the invention to provide reactive hot melt-type adhesive compositions which can be applied at relatively low temperature ranges of 100° – 130°C. and can be used for bonding polymers, metal, wood, stone or fabric to each other or to different materials.

It has previously been impossible to obtain such compositions by mixing conventional hot melt-type adhesives with the conventional reactive-type adhesives. The reason for this difficulty may be easily deduced from consideration of the relations of the temperatures of reactions and coating these adhesive types, the viscosities and pot-lives and the miscibility of the components. In the adhesive composition of the invention, the contradictory relations of the functions are solved by a choice of components whereby said three requirements for a commercial layering adhesive have been satisfied. The reactive hot melt-type adhesive compositions of this invention comprise:

A. a urethane prepolymer having terminal isocyanate groups at the ends thereof;

B. a thermoplastic resin of an ethylene-vinylacetate copolymer, an ethylene-acrylic acid copolymer, an ethylene-acrylate copolymer, an atactic polypropylene or a polyethyleneterephthalate linear polymer; and C. a tackifier selected from among: abietic acid-type rosins having the active hydrogens or double bonds removed by esterification in whole or in part; and terpene-phenol copolymers wherein the terpene is a monoterpene having 10 carbon atoms such as α-pinene, β-pinene, camphene, myrcene, dipentene, β-phellandrene, Δ³-carene, sabinene, ocimene, α-terpinene and hydrogenated compounds thereof or an analagous diterpene having 20 carbon atoms.

DETAILED DESCRIPTION OF PREFERRED EMBODIMENTS

The urethane prepolymers (A) used in the adhesive composition of the invention can be prepared by an addition polymerization of a diisocyanate with a diol. The diisocyanate can for example, be 2,4-tolylenediisocyanate, 2,6-tolylenediisocyanate, 4,4'-diphenylmethanediisocyanate, hexamethylenendiisocyanate or 1,5-naphthylenediisocyanate or mixtures thereof. The diol can be any of ethyleneglycol, propyleneglycol, 1,4-butanediol or 1,4-butinediol, or polymers thereof, polytetramethylene glycolether or mixtures of any or all of these.

It is preferable that the urethane prepolymer have a viscosity higher than 300,000 cps. at 25°C. When the urethane prepolymer has a viscosity of lower than 300,000 cps. at 25°C., the resulting adhesive composition while it has a suitable viscosity at the time of bonding, has an inferior instant adhesive strength, (as shown in Example 3 infra). If the ratio of the tackifier (C) or the ethylene-vinylacetate copolymer (B) to the urethane prepolymer (A) is increased, the instant adhesive strength will be increased but the final adhesive strength is decreased. (See Table 3 in Example 2).

The urethane prepolymer (A) having terminal isocyanate groups at the ends of the molecule, is used, because such a urethane prepolymer is chain-extended by the reactions of the isocyanate groups with the moisture in the air after plying and bonding as shown in the formula (I) so as to form a polymer having a high molecular weight and so increase the cohesive force of the adhesive composition. The interfacial adhesive strength is also increased as shown in formula II when the substrate has active hydrogen atoms on the surface.

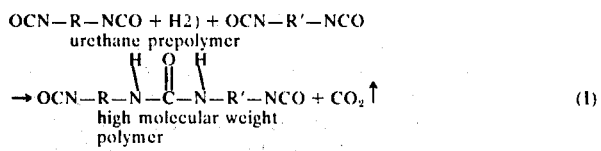

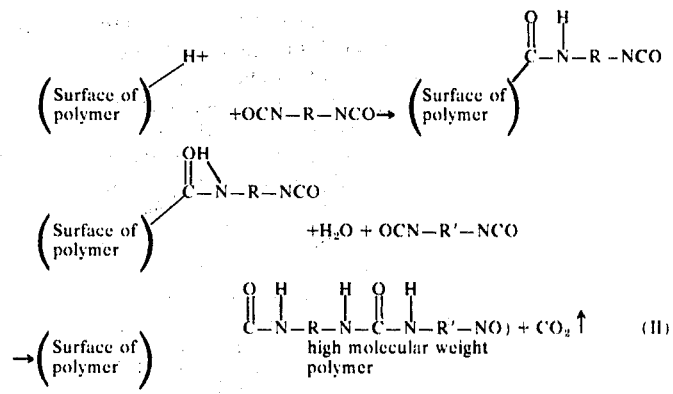

The ethylene-vinylacetate copolymer of the thermoplastic resin component (B) has a vinylacetate content of 5 – 70 wt.% preferably 19 – 40 wt.%. When the vinylacetate content is less than 5 wt.%, the miscibility and consequent cohesion of the copolymer with the urethane prepolymer is inferior, thus providing a too low final cohesive force of the adhesive composition and too low an instant adhesive strength for practical use. On the other hand, when the vinylacetate content is higher than 70 wt.%, while the miscibility is good, the final adhesive strength is again too low for practical use. The polyethyleneterephthalate type linear polyesters of component B should have an average molecular weight of 8,000 – 25,000 and softening point of lower than 123°C. They can be prepared by an addition-condensation of a monomer or oligomer of a divalent alcohol such as 1,4-butandiol, 1,4-butleneglycol, ethyleneglycol, propyleneglycol, tetramethylene ether glycol, neopentylglycol or 1,6-hexanediol or mixtures thereof with terephthalic acid. A part of the terephthalic acid can be substituted by isophthalic acid, phthalic acid, dimethylphalate, dimethylisophthalate, linolic acid liquid dimer, dibutylsebacate, sebacid acid or mixtures thereof.

The ethylene-acrylate copolymer of component B can be an ethylene-ethylacrylate copolymer, an ethylene-butylacrylate copolymer, or an ethylene-2-ethyl hexyl acrylate copolymer, etc. The ethylene components in the copolymer are preferably in a range of 70 – 95 wt.%. When the ethylene component is less than 70 wt.%, the final adhesive strength is low, although the miscibility with the urethane prepolymer is good, and the coating is facilitated. On the other hand, when the ethylene component is higher than 95 wt.%, miscibility with the urethane prepolymer is too low so the cohesive force of the adhesive composition is low and instant adhesive strength is reduced. The atactic polypropylene of component B has a random configuration of the methyl group in of the units of $\pm CH_2-CH-CH_3 \pm_m$, a specific gravity of 0.8 – 0.9 and a molecular weight of 2000 – 100,000, and is primarily in amorphous, non-crystal form.

The tackifiers (C) should have good miscibility with the urethane prepolymer. They should have low viscosity at 100 to 130°C., are solid at about 60°C., and should have high tackiness. In this invention, the tackifiers impart high cohesive force at temperatures below about 60°C. and high instant adhesive strength.

The tackifier components (C) include a terpene-phenol copolymer having a molar ratio of terpene to phenol of 1.0 – 3.0 or (b) abietic acid type rosins whose active hydrogens or double bonds are removed by esterification etc., in whole or in part; such as hydrogenated rosin, hydrogenated rosin glycerine ester, hydrogenated rosin pentaerythritol, disproportionated rosin, polymerized rosin, etc.

The preferred terpenes are monoterpenes having 10 carbon atoms such as α-pinene, β-pinene, camphene, myrcene, dipentene, β-phellandrene, $\Delta^3$-carene, sabinene, ocimene, α-terpinene and hydrogenated compounds thereof. When the preferred α-pinene is used, optimum properties are imparted in the form of miscibility, pot-life and initial and final adhesive strength. Diterpene analogs of the above monoterpenes having 20 carbon atoms are also useful.

When the other types of tackifiers such as gum rosin, rosin modified glycerin esters, rosin modified phenolglycerin esters, xyleneformaldehyde condensates, octylphenol-formaldehyde condensates, etc., are used, they react with the isocyanate group to shorten the pot-life of the adhesive composition to a point where they are uneconomic.

The other known types of tackifiers such as the alicyclic olefins, petroleum resins, hydrogenated petroleum resins, β-pinene polymers, hydrogenated β-pinene polymers, etc. have low miscibility with the urethane prepolymer and as a result the adhesive cohesive force of the urethane prepolymer is decreased.

Suitable proportions of three components in the adhesive composition of the invention to impart good properties are as follows:

(A) → urethane prepolymer    20 – 73 wt.%
(B) → thermoplastic resin    2 – 25 wt.%
(C) → tackifier              25 – 55 wt.%

When the proportion of urethane prepolymer (A) is lower than 20 wt.%, the adhesive composition is hard and brittle even though the reaction is completed after application between the substrates. The isocyanate-group content which contributes to adhesive strength is too low and the proportion of urethane resin in the adhesive composition, especially at the interface of the substrates is too low to contribute effective cold or hot adhesive strength.

On the other hand, when the proportion of urethane prepolymer (A) is higher than 73 wt.%, the adhesive composition has a low initial cohesive force when applied between the substrates. The instant adhesive strength at such proportions is too low at temperatures lower than 60°C. To impart high instant adhesive strength to such compositions requires an increase in the proportions of components (B) and (C), however, such modification cause a decrease of isocyanate group content making it difficult to impart cold and hot adhesive strength to the bonds.

When a proportion of the thermoplastic resin (B) is lower than 2 wt.%, the miscibility of the three components is too high. The cold and hot adhesive strength is too low even though the reaction is completed after applying it between the substrates. On the other hand, when the proportion of the thermoplastic resin (B) is greater than 25 wt.%, the miscibility of the three components is poor. As a result the cohesive force of the adhesive composition is low after applying it too low at temperatures below about 60°C.

When the proportion of the tackifier (C) is lower than 25 wt.%, it is difficult to impart a high adhesive cohesive force to the urethane prepolymer. As a result, the instant adhesive strength after applying it between the substrates is deficient at temperatures below 60°C. On the other hand, when the proportion of tackifier is so high that the adhesive composition becomes brittle it cannot impart initial high adhesive strength.

The adhesive composition of this invention is of the non-solvent type having 100% solid components. In coating, no drying step to strip off a solvent is required. It provides desirable coating viscosity, (2000 – 9000 cps. with no threading) which can be achieved by heating at a relatively low temperature of about 100° – 130°C., compared to conventional hot melt-type adhesive compositions which are applied at about 170° – 180°C. When using the compositions of this invention, the bonding operation can be economical as regards to heating costs and equipment corrosion. Moreover, as the urethane prepolymer has chemically active isocyanate groups, the other two components are selected to be inert to this urethane prepolymer, and as a result the compositions of this invention have a long practical pot-life at the low temperatures used for application.

The conventional polyethyleneterephthalate linear hot melt adhesive compositions have been used at a temperature of about 200°C. but such temperatures cause discolouring and foul odors. However, with the compositions and methods for their use of this invention, the bonding operations are performed at low temperatures ranging at about 100° – 130°C., avoiding such problems.

The isocyanate groups of the adhesive composition react with moisture in the air to impart a cure. The curing time is thus relatively long and as the urethane prepolymer is in a mixed condition, the viscosity and the adhesive strength are maintained uniform for more than two hours from initial melting to coating. Even though the adhesive composition of this invention is coated by roller coat methods in air, the adhesive composition has a sufficiently long pot-life to be industrially practical and can be coated at low temperatures of 100° – 130°C. as a hot melt adhesive composition.

A function of a good adhesive composition is to provide good bonding after coating by imparting high instant adhesive strength comparable with that of conventional hot melt-type adhesive compositions. The adhesive composition of this invention imparts high viscosity and high cohesive force upon cooling to temperatures below about 60°C., even though the composition has a low viscosity at a relatively low temperature of 100° – 130°C. The low viscosity at temperatures of 100° – 130°C. permits the substrates to be positioned and adhered to each other after coating. The bonding speed can be hastened when the difference between the coating temperature and the bonding temperature is reduced compared to the coating with conventional hot melt adhesive compositions at about 170° – 180°C. It has been possible to impart large viscosity changes with a small difference of temperature by adding viscosity improving agents such as waxes to conventional hot melt adhesive compositions. However, wax decreases the adhesive strength so that only small amounts of wax can be added. Accordingly, in order to impart an instant adhesive strength equal to the strength of the adhesive composition of this invention, the coating temperatures of conventional adhesives would have to be raised above 170° – 180°C.

The combination of the three components (A), (B) and (C) of the present invention can impart good instant adhesive strength without requiring addition of viscosity improving agents such as wax, etc. and permits coating at low temperatures in the range 100° – 130°C.

The final bonded multi-layer products resulting from the compositions of this invention have high final adhesive strength equal to strengths achieved with the conventional reactive adhesive agents. The strength of bonds from reactive adhesives is superior to bonds with conventional hot melt-type adhesive compositions. The use-environment temperature range of the adhesive compositions of this invention is far higher than that of the conventional hot melt adhesive compositions and is similar to that of the reactive type adhesive compositions, particularly in the bonding of substrates such as polyolefins. As stated above, with the adhesive composition of this invention, it is possible to coat the composition comprising the three components (A) (B) (C) on various substrates at about 100° – 130°C. with a long practical pot-life for the compositions and to impart good instant adhesive strength at the time of bonding and also to impart excellent final adhesive strength and a high use-environment temperature range. Thus the compositions and methods of this invention satisfy all three important requirements for an adhesive composition suitable for industrial bonding.

The present invention provides compositions with the advantageous properties of both the hot melt-type and the reactive-type adhesive compositions.

The adhesive composition of this invention is used as follows: The three components (A), (B) and (C) are heated to 100° – 130°C. preferably about 120°C., to form a molten mixture having a viscosity of about 2000 cps. at 130°C. to 9000 cps. at 100°C. Any suitable coating apparatus can be used such as conventional hot melt coaters including roller coater (gravure roller, reverse roller) curtain coaters, nozzles, sprays, doctor blades, etc. equipped with heated melting vessels or pots. The melting vessel can be purged with nitrogen gas to insure long pot-life, however the adhesive compositions of this invention have a pot-life of at least 2 hours at 130°C. to at least 5 hours at 100°C. even when exposed to the ambient atmosphere.

Coating can be made practically continuous by adding and melting the adhesive composition of the invention to the melting vessel as the composition is consumed by the coater. After coating the adhesive composition on the substrate with the coating apparatus, the other substrate is applied to the coated surface with pressure for 2 or 3 seconds for bonding. After bonding, the pressure can be discontinued and the adhesive composition is cooled below 60°C. When the substrate applied is at a room temperature, the pressure can usually be removed within 1 second as the temperature at the bond will be rapidly reduced below 60°C. When the bonded multi-layered substrate is cured in the presence of moisture for example, for 20 hours at 40PC. in a 90% relative humidity, the full final adhesive strength is achieved.

The adhesive composition of this invention can be applied to various substrates including thermosetting or thermoplastic resins, films, fibers or shaped objects, metals, paper, asbestos, slate, etc. for which conventional adhesive compositions have previously been applied.

Excellent adhesive bonds can be imparted even with polyolefins such as polyethylene and polypropylene which are relatively difficult to bond with conventional adhesive compositions.

The adhesive composition of this invention is effective as an adhesive composition to be used for the preparation of multilayered sheets of corrugated board by corrugating a polyolefin sheet with a corrugator and then bonding it to a linear layer to form the corrugated board.

The invention will be further illustrated by examples and test results upon the resultant products.

Measurements

Instant Adhesive Strength

Polypropylene films each having a length of 10 cm. and a width of 2 cm. were separately placed on separate stainless steel plates each heated at 30°C. and 60°C. respectively.

The test adhesive composition was coated on the film at a rate of 20 g/m$^2$ and 1 cm. of the edge of one film was plied onto 1 cm. of the edge of the other film and the bonded films were immediately (within 5 seconds) peeled off. The adhesive strength at the time of peeling off per 2 cm. width was measured by a spring scale.

Final Adhesive Strength

A multi-layered sheet bonded with the test adhesive composition was cured 20°C. and 65% relative humidity for 7 days and the sheet was kept at the measuring temperature for 2 hours and then the adhesive strength was measured by peeling off at a rate of pulling of 200 mm./min. to 90° by using Instrone-type autograph tension tester.

Viscosity at Melting

Viscosity of melted adhesive composition was measured by using a rotary viscosimeter (VT-02 type) (manufactured by Rion Co.) with No. 2 rotor.

[EXAMPLE 1]

Polypropylene multi-layered sheets are shown in Table 2 together with those of the sheets adhered with the conventional adhesive compositions.

| | |
|---|---|
| Sample 1 | Adhesive composition of the invention |
| | (A) reactive component |
| |     Addition polymer of polypropyleneglycol and toluenediisocyanate having molecular weight of 2000 to 6000 and viscosity of 1610,000 cps./at 25°c. |
| | (B) thermoplastic component |
| |     Ethylene vinyacetate copolymer with 50 wt.% vinyl acetate content. |
| | (C) (Tackifier) |
| |     Terpene-phenol copolymer (molar ratio of 1.8/1.0 of terpene to phenol) having softening point of 115°C. |
| | (A): (B): (C) = 50: 7.5: 42.5 wt.% |
| Sample 2 | Conventional emulsion type adhesive |
| |     emulsion of carboxylated butadiene-styrene copolymer |
| Sample 3 | Conventional non-solvent monomer type reactive adhesive |
| |     α - cyanoacrylate |
| Sample 4 | Conventional hot melt-type adhesive |
| | Ethylene-vinylacetate copoly-    ethylene-vinylacetate copolymer (MI 150) |
| | mer type    (VAC) 50 wt.% |
| |    paraffin wax (151°F.) |
| |    rosin ester |
| Sample 5 | Conventional prepolymer-type reactive adhesive |
| |     urethane prepolymer having NCO at both ends 68 g. |
| |     4,4'-methylene bis-2-chloroaniline 14 g. |
| Sample 6 | Conventional solvent type reactive adhesive |
| |     polyester type adhesive |
| |     ethylacetate solvent |

[EXAMPLE 2]

To ascertain the effect of the viscosity of the urethane prepolymer used for this invention, the adhesive strength of polypropylene multi-layered sheets which were bonded at 120°C. by using adhesive compositions, containing various urethane prepolymers each having a different viscosity, at a range of 10 g/m², were measured. The adhesive compositions were prepared by mixing 50 wt.% of the urethane prepolymer (A) 42.5 wt.% of tackifier, α-pinene-phenol copolymer (C) and 7.5 wt.% of the thermoplastic ethylene-vinylacetate copolymer (B). The results of adhesive strength tests are shown in Table 3 wherein the high adhesive strength resulting from using the adhesive compositions containing urethane prepolymer having higher than 300,000 cps. at 25°C. is evident.

TABLE 2

| Sample Type of Adhesive | 1 Invention Hot Melt | 2 Emulsion | 3 Monomer | 4 Hot melt | 5 Prepolymer | 6 Solvent |
|---|---|---|---|---|---|---|
| Temperature at bonding (°C.) | 120 | room | room | 180°C. | room | room |
| Instant adhesive strength (kg/cm) | | | | | | |
|   35°C. | 2.5 | 0 | 0 | 2.8 | 0 | 0 |
|   60°C. | 0.1 | 0 | 0 | 0.08 | 0 | 0 |
| Adhesive strength after 1 week (kg/cm) | | | | | | |
|   − 20°C. | 6.5 | 0 | 0 | 0 | 5.0 | 0.1 |
|   0°C. | 6.0 | 0.01 | 0.01 | 0.9 | 6.0 | 0.5 |
|   20°C. | 6.0 | 0.1 | 0 | 3.0 | 6.0 | 0.6 |
|   60°C. | 4.0 | 0 | 0 | 0.08 | 4.5 | 0.2 |
|   80°C. | 2.0 | 0 | 0 | 0 | 3.0 | 0. |

TABLE 3

| Viscosity of urethane prepolymer (cps. at 25°C.) | Viscosity of melted adhesive strength (cps. at 120°C.) | Instant adhesive strength (kg/cm) | | Adhesive strength after 1 week (kg/cm) | | |
|---|---|---|---|---|---|---|
| | | 35°C. | 60°C. | 0°C. | 20°C. | 60°C. |
| 1  $14 \times 10^3$ | $2 \times 10^3$ | 0.4 | 0.01 | 6.0 | 6.0 | 3.0 |
| 2  $105 \times 10^3$ | $2 \times 10^3$ | 0.5 | 0.01 | 6.0 | 6.0 | 2.8 |
| 3  $250 \times 10^3$ | $2.3 \times 10^3$ | 0.8 | 0.03 | 6.0 | 6.0 | 3.0 |
| 4  $300 \times 10^3$ | $2.8 \times 10^3$ | 1.5 | 0.05 | 6.0 | 6.0 | 3.5 |
| 5  $1,610 \times 10^3$ | $3.0 \times 10^3$ | 2.5 | 0.1 | 6.0 | 6.0 | 4.0 |
| 6  $2,500 \times 10^3$ | $3.4 \times 10^3$ | 2.9 | 0.12 | 6.0 | 6.0 | 3.0 |

Example 2. The resulting adhesive strengths are shown in Table 4.

TABLE 4

| | Proportion components in adhesive composition (wt.%) | | Viscosity of melted adhesive composition (cps. at 120°C) | Instant adhesive strength (kg/cm) | | Adhesive strength after 1 week (kg/cm) | | |
|---|---|---|---|---|---|---|---|---|
| | | | | 35°C. | 60°C. | 0°C. | 20°C. | 60°C. |
| 1 | A | 50 | 3000 | 2.5 | 0.1 | 6.0 | 6.0 | 4.0 |
| | B | 7.5 | | | | | | |
| | C | 42.5 | | | | | | |
| 2 | A | 30 | 6300 | 1.0 | 0.12 | 3.5 | 4.0 | 2.5 |
| | B | 20 | | | | | | |
| | C | 50 | | | | | | |
| 3 | A | 20 | 9000 | 0.8 | 0.08 | 3.0 | 3.0 | 2.4 |
| | B | 25 | | | | | | |
| | C | 55 | | | | | | |
| 4 | A | 50 | 5400 | 1.4 | 0.04 | 5.5 | 6.0 | 3.0 |
| | B | 25 | | | | | | |
| | C | 25 | | | | | | |
| 5 | A | 50 | 7500 | 0.9 | 0.01 | 4.5 | 5.0 | 1.8 |
| | B | 20 | | | | | | |
| | C | 30 | | | | | | |
| 6 | A | 73 | 1500 | 0.7 | 0.02 | 6.5 | 7.0 | 4.0 |
| | B | 2 | | | | | | |
| | C | 25 | | | | | | |
| 7 | A | 15 | 11500 | 0.2 | 0.06 | 1.0 | 1.0 | 0.2 |
| | B | 25 | | | | | | |
| | C | 60 | | | | | | |
| 8 | A | 30 | 10500 | 0.3 | 0.02 | 0.9 | 1.2 | 0.6 |
| | B | 10 | | | | | | |
| | C | 60 | | | | | | |
| 9 | A | 75 | 2100 | 1.2 | 0.02 | 1.0 | 1.8 | 2.5 |
| | B | 0 | | | | | | |
| | C | 25 | | | | | | |

[EXAMPLE 3]

Various adhesive compositions containing various proportions of the urethane prepolymer (A), the thermoplastic ethylenevinylacetate copolymer (B) and the tackifier (C) of terpenephenol copolymer were prepared and two polypropylene sheets were bonded under the conditions of Example 2. The types of the urethane prepolymer, the thermoplastic ethylene-vinylacetate and the tackifier were the same as those of

[EXAMPLE 4]

Adhesive compositions were prepared in accordance with Example 3 except replacing the thermoplastic ethylenevinylacetate copolymer with thermoplastic ethylene ethylacrylate copolymer (D) having 20 wt.% of ethyl acrylate component. Adhesive strengths of the multi-layered sheets prepared by bonding with the adhesive compositions were measured, respectively. The results are shown in Table 5.

TABLE 5

| | Proportion components adhesive composition | | Viscosity of melted adhesive composition | Instant adhesive strength (kg/cm) | | Adhesive strength after 1 week (kg/cm) | | |
|---|---|---|---|---|---|---|---|---|
| | | | | 35°C. | 60°C. | 0°C. | 20°C. | 60°C. |
| 1 | A | 50 | 3000 | 2.0 | 0.08 | 6.0 | 6.0 | 3.0 |
| | C | 42.5 | | | | | | |
| | D | 7.5 | | | | | | |
| 2 | A | 30 | 6300 | 1.0 | 0.12 | 3.0 | 3.0 | 2.4 |
| | C | 50 | | | | | | |
| | D | 20 | | | | | | |
| 3 | A | 20 | 9000 | 0.8 | 0.08 | 3.0 | 3.0 | 2.4 |
| | C | 55 | | | | | | |
| | D | 25 | | | | | | |
| 4 | A | 73 | 1500 | 0.7 | 0.02 | 6.5 | 7.0 | 4.0 |
| | C | 25 | | | | | | |
| | D | 2 | | | | | | |
| | A | 50 | | | | | | |

TABLE 5-continued

| | Proportion components adhesive composition | | Viscosity of melted adhesive composition | Instant adhesive strength (kg/cm) | | Adhesive strength after 1 week (kg/cm) | | |
|---|---|---|---|---|---|---|---|---|
| | | | | 35°C. | 60°C. | 0°C. | 20°C. | 60°C. |
| 5 | C | 25 | 5400 | 1.4 | 0.04 | 5.5 | 6.0 | 3.0 |
| | D | 25 | | | | | | |
| | A | 15 | | | | | | |
| 6 | C | 60 | 11500 | 0.2 | 0.06 | 1.0 | 1.0 | 0.2 |
| | D | 25 | | | | | | |
| | A | 75 | | | | | | |
| 7 | C | 25 | 2100 | 1.2 | 0.02 | 1.0 | 1.8 | 2.5 |
| | D | 0 | | | | | | |
| | A | 30 | | | | | | |
| 8 | C | 60 | 10500 | 0.3 | 0.02 | 0.9 | 1.2 | 0.6 |
| | D | 10 | | | | | | |
| | A | 50 | | | | | | |
| 9 | C | 20 | 7500 | 0.9 | 0.01 | 4.5 | 5.0 | 1.8 |
| | D | 30 | | | | | | |

[EXAMPLE 5]

Adhesive compositions were prepared in accordance with Example 2 except replacing the ethylene-vinylacetate copolymer with an equal amount of ethylene-ethylacrylate copolymer (D) having 20 wt.% of ethylacrylate component. The adhesive strengths of the multi-layered sheets, prepared by bonding with these adhesive compositions were measured and the results are shown in Table 6.

TABLE 6

| Viscosity of urethane prepolymer | Viscosity of melted adhesive composition | Instant adhesive strength (kg/cm) | | Adhesive strength after 1 week (kg/cm) | | |
|---|---|---|---|---|---|---|
| (cps at 25°C) | (cps at 120°C) | 35°C. | 60°C. | 0°C. | 20°C. | 60°C. |
| 1 | 14×10³ | 2200 | 0.4 | 0.01 | 6.0 | 6.0 | 3.0 |
| 2 | 105×10³ | 2600 | 0.5 | 0.01 | 6.0 | 6.0 | 2.8 |
| 3 | 305×10³ | 3100 | 1.5 | 0.05 | 6.0 | 6.0 | 3.5 |
| 4 | 1610×10³ | 3200 | 2.0 | 0.08 | 6.0 | 6.0 | 4.0 |
| 5 | 2500×10³ | 3500 | 2.5 | 0.10 | 6.5 | 4.5 | 3.0 |

[EXAMPLE 6]

An adhesive composition was prepared by mixing the following components:

| Component A | 50 wt.% |
|---|---|
| Component C | 42.5 wt.% |
| Component D (Example 5) | 7.5 wt.% |

The adhesive composition was kept at various temperatures at a relative humidity of 65% and the pot-life of the adhesive composition was measured. The results are shown in Table 7.

TABLE 7

| Temperature | Pot-life |
|---|---|
| 95°C. | 360 min. |
| 100°C. | 300 |
| 110°C. | 270 |
| 120°C. | 240 |
| 130°C. | 130 |
| 140°C. | 60 |

The pot-life, as shown, is the time required for an increase in the viscosity of 25% of the initial viscosity.

[EXAMPLE 7]

Adhesive compositions were prepared in accordance with Example 3 except replacing the thermoplastic ethylene-vinyl-acetate copolymer by the thermoplastic resins shown in Table 8.

The adhesive strengths of the multi-layered sheets prepared by bonding with the adhesive compositions were measured, and the results are shown in Table 8.

TABLE 8

| Thermoplastic resin | Viscosity of melted adhesive composition (cps. at 120°C.) | Instant adhesive strength (kg/cm) | | Adhesive strength after 1 week (kg/cm) | | |
|---|---|---|---|---|---|---|
| | | 35°C. | 60°C. | 0°C. | 20°C. | 60°C. |
| Atatic polypropylene (SG0.87 Mn=50000) (t-Bu 11wt.%) | 6500 | 1.6 | 0.07 | 3.0 | 3.0 | 2.8 |
| Ethylene t-butyl acrylate | 4500 | 2.0 | 0.08 | 3.0 | 5.0 | 3.0 |
| Polyethylene terephthalate linear polymer | 8000 | 1.2 | 0.06 | 3.0 | 4.0 | 4.2 |

TABLE 8-continued

| Thermoplastic resin | Viscosity of melted adhesive composition (cps. at 120°C.) | Instant adhesive strength (kg/cm) | | Adhesive strength after 1 week (kg/cm) | | |
|---|---|---|---|---|---|---|
| | | 35°C. | 60°C. | 0°C. | 20°C. | 60°C. |
| Ethylene-acrylic acid copolymer | 3600 | 1.8 | 0.09 | 5.0 | 6.0 | 3.0 |

What we claim is:

1. A reactive hot melt-type adhesive composition comprising (a) a reactive compound, (b) a thermoplastic resin and (c) a tackifier; wherein:
   a. the reactive compound is a urethane prepolymer having terminal isocyanate groups at both ends thereof and a viscosity higher than 300,000 cps at 25°C; resulting from the addition polymerization of at least one diisocyanate and at least one diol
   b. the thermoplastic resin is an ethylene-vinylacetate co-polymer or an ethylene-acrylic acid copolymer, or an ethyleneacrylate copolymer or an atactic polypropylene or a polyethyleneterephthalate linear polymer; and
   c. the tackifier is a hydrogenated abietic acid-type rosin or esters thereof having its double bonds removed by hydrogenation in whole or in part, or a terpene-phenol copolymer of a mono- or diterpene wherein the terpene has 10 carbon atoms and having a 1.0 to 3.0 molar ratio of terpene to phenol; said adhesive composition comprising 20 – 73 wt % of said urethane prepolymer (a), 2 – 25 wt % of said thermoplastic resin (b) and 25 – 55 wt % of said tackifier (c) said composition having a viscosity ranging from 9000 cp to 2000 cp in the temperature range of 100° – 130°C.

2. The adhesive composition according to claim 1 wherein the urethane prepolymer is an addition polymerization product of a diisocyanate selected from the group consisting of 2,4-tolylenediisocyanate, 2,6-tolylenediisocyanate, 4,4'-diphenylmethanediisocyanate, hexamethylene diisocyanate, or 1,5-naphthylenediisocyanate or a mixture thereof; and a diol selected from the group consisting of ethyleneglycol, propyleneglycol, 1,4-butanediol or 1,4-butinediol or polymers thereof, polytetramethyleneglycol ether or a mixture thereof.

3. The adhesive composition according to claim 1 wherein said thermoplastic resin is a thermoplastic ethylene-vinylacetate copolymer having a vinylacetate content of 5 – 70 wt.%.

4. The adhesive composition according to claim 1 wherein said thermoplastic resin is a thermoplastic ethylene-ethylacrylate copolymer having an ethylene content of 70 – 95 wt.%.

5. The adhesive composition according to claim 1 wherein said tackifier has good miscibility with the urethane prepolymer, is non-reactive, with the terminal isocyanate groups thereof, has a low viscosity at 100° to 130°C. and is solid at 60°C.

* * * * *

UNITED STATES PATENT OFFICE
CERTIFICATE OF CORRECTION

PATENT NO. : 3,931,077
DATED : January 6, 1976
INVENTOR(S) : UCHIGAKI et al

It is certified that error appears in the above-identified patent and that said Letters Patent are hereby corrected as shown below:

The assignee should read:

"Mitsubishi Petrochemical Co. Ltd."

Signed and Sealed this

Fifth Day of October 1976

[SEAL]

Attest:

RUTH C. MASON
Attesting Officer

C. MARSHALL DANN
Commissioner of Patents and Trademarks